Sept. 18, 1928.
H. OLSEN
SOIL WORKING IMPLEMENT
Filed July 5, 1927
1,684,594
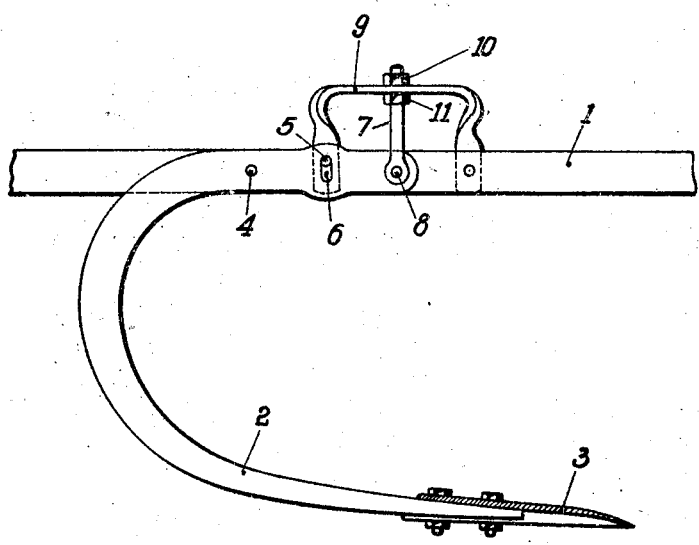
Inventor
Hans Olsen

UNITED STATES PATENT OFFICE.

HANS OLSEN, OF ALSLOV, NEAR KARISE, DENMARK.

SOIL-WORKING IMPLEMENT.

Application filed July 5, 1927, Serial No. 203,639, and in Denmark July 13, 1926.

This invention relates to a device for use in connection with such soil-working implements and machines as hoes, horse-rakes, harrows, weeding machines, and the like, the respective tool being attached to an arm or the like, and this arm attached adjustably to a wheeled frame, the arrangement being such that the tool can be caused to enter or cut, etc. more or less deeply into the soil.

I attain the object in view, viz the adjustability of the soil-working tool, by attaching the arm carrying it to the frame of the implement or machine by a bolt upon which said arm can be turned, and by connecting another point of the tool-carrying arm with an adjustable bolt connected with a bow connected in turn with that part of the frame to which the said arm is hinged. This latter is adjusted together with the tool by adjusting said bolt relatively to said bow, and after the adjustment the tool-carrying arm can be fixed in its new position by means of another bolt carried by the frame-part concerned and passing through a slot in the arm, as is all more fully described hereinafter.

The invention is illustrated diagrammatically and by way of example on the accompanying drawing on which it is shown in side-view, the weeding tool being shown in vertical section.

On the drawing, 3 denotes a weeding tool which is affixed to a curved arm 2 attached movably to a member 1 forming a part of the frame which is wheeled, as usual with weeding and many other agricultural machines. The arm 2 and said member 1 are connected with each other by a bolt 4 on which said arm can be turned, and the arm 2 is connected, furthermore, by a bolt 8 with a vertical adjusting bolt 7 extending upwardly and with its threaded free end passing through a bow 9 affixed to the member 1. The threaded end of the bolt 7 is provided with two nuts 10 and 11, by means of which it can be adjusted in the bow 9 and secured in its adjusted position. There is also a bolt 5 which is also located in the member 1 and passes through a slot 6 of the arm 2. This bolt is also provided with nuts (not shown) by which the arm 2 can be clamped fast after the adjustment so that it is secured in a twofold manner and cannot give way when the tool 3 overcomes the resistances it encounters in its path.

I claim:

An adjustable fastening device for a soil-working implement, comprising, in combination a downwardly extending arm carrying the respective soil-working implement, a bolt by which said arm is hinged to a rearwardly extending part of the implement frame, a bow secured to said part, an adjusting and fixing bolt hinged at one end to the said arm and extending with its other end which is threaded through said bow, nuts located upon said threaded bolt end, and separate means for securing the said arm with its tool in its adjusted position substantially as and for the purpose set forth.

In testimony whereof I affix my signature.

HANS OLSEN.